March 2, 1937.  H. C. SCHOEPFLIN  2,072,774
GRAVE MARKER AND FLOWER HOLDER
Filed Aug. 8, 1936
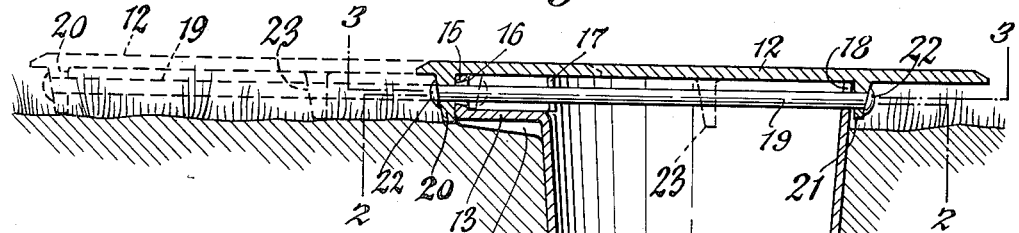
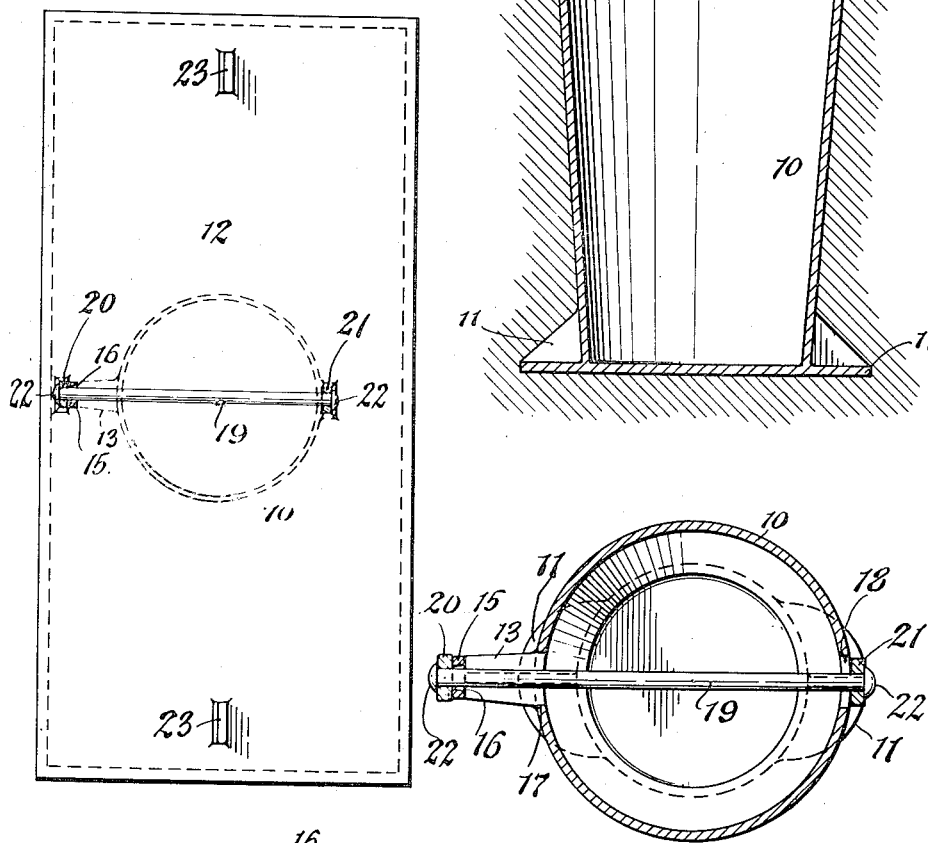
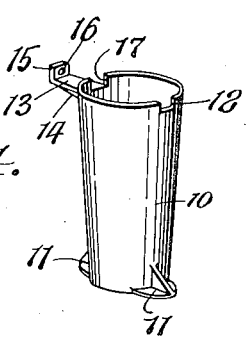
INVENTOR
Herbert C. Schoepflin
BY
Popp & Popp
ATTORNEYS Patented Mar. 2, 1937

2,072,774

UNITED STATES PATENT OFFICE 2,072,774

GRAVE MARKER AND FLOWER HOLDER

Herbert C. Schoepflin, Buffalo, N. Y.

Application August 8, 1936, Serial No. 94,981

8 Claims. (Cl. 47—41)

This invention relates to a combined grave marker and flower holder for use in cemeteries for locating graves and decorating the same.

It is one of the purposes of this invention to provide a device for this purpose which permits of marking a grave and decorating the same with flowers or the like when desired without any part of the device projecting an appreciable extent above the surface of the ground but instead will always have its uppermost part substantially flat and practically flush or even with the surface of the ground.

Another object of this invention is to construct this device of few parts and at low cost so as to permit of the same coming into general use. This invention has the further aim to so organize the several parts that they are strong and durable and not liable to get out of order, and also can be easily and conveniently converted for use either as a grave marker or a grave marker and flower holder.

In the accompanying drawing:

Fig. 1 is a vertical section of the grave marker and flower holder embodying this invention.

Fig. 2 is a horizontal section of the same, taken on line 2—2, Fig. 1, looking downwardly.

Fig. 3 is a horizontal section, taken on the correspondingly numbered line in Fig. 1 looking upwardly.

Fig. 4 is a perspective view of the flower pot detached from the lid which serves as an inscription plaque and also as means for covering and uncovering the pot.

The means for holding the flowers or similar grave decoration include an upright pot 10 which is preferably of upwardly flaring conical form and adapted to be sunk in the ground of the cemetery or the like so that the pot has its large upper open end slightly above the surface of the ground and therefore substantially flush therewith, as shown in Fig. 1.

For the purpose of anchoring this pot in the ground and prevent easy withdrawal therefrom the lower end thereof is provided with anchoring or retaining lips 11 which upon being embedded in the ground increase the horizontal area of engagement of the pot with the ground and effectively resist vertical displacement of the pot from the ground either by manual effort or frost action.

The numeral 12 represents a horizontal plate which is adapted to be moved over the top of the pot and serves as a lid for covering the same when it is not in use for holding flowers or the like and also to be moved to one side of the pot for uncovering the pot when it is desired to place flowers in the pot for decorating the grave. This plate or lid is preferably of oblong and rectangular form and its upper side may be provided with any suitable inscription for marking the particular grave or plot of ground in which the pot has been embedded.

Means are provided whereby this lid is permanently connected with the pot for preventing the lid from being maliciously carried away and still enable the lid to be readily moved into an open or closed position relative to the pot, and also be interlocked therewith when closed so as to prevent accidental opening of the lid.

Although various means may be employed for this purpose those shown in the drawing have been found satisfactory in practice and are constructed as follows:

The numeral 13 represents a horizontal supporting arm projecting laterally from the side of the flower pot adjacent to the upper edge thereof and provided on its underside with a longitudinal strengthening rib 14. At its outer end this arm is provided with an upwardly projecting guide eye 15, the opening 16 in which is preferably flared inwardly, as shown in Figs. 1, 2 and 3. At the inner end of the supporting arm the adjacent upper edge portion of the flower pot is provided with an upwardly opening clearance notch or recess 17 and on the upper edge portion of the flower pot diametrically opposite the supporting arm and notch 17 another upwardly opening clearance notch or recess 18 is provided. The body of the flower pot and the anchoring lips together with the supporting arm and guide eye, are preferably formed in one casting of any suitable material, such for example as bronze or other non-corrosible metal which will withstand disintegration when exposed to the elements.

Arranged horizontally underneath the lid and preferably transversely thereof is a sliding coupling rod 19 which is permanently connected at its opposite ends with attaching lugs 20, 21 projecting downwardly from the underside of the lid, this connection being preferably effected by passing this rod through these lugs and upsetting or riveting the ends of the rod against the outer side of these lugs, as shown at 22 in Figs. 1, 2 and 3.

Intermediate of the connecting lugs 20, 21 the coupling rod 19 passes through the guide eye 15 and is capable of not only sliding horizontally through the same but also tilting vertically relative thereto to a limited extent.

When the flower pot is not in use the lid is moved inwardly over the pot so as to cover the upper end of the same and during this movement the coupling rod slides horizontally in the eye 15. While moving the lid over the pot the same is also lifted sufficiently to permit the connecting lug 21 to pass over the upper edge of the pot adjacent to the notch 19. This inward or closing movement of the lid is limited by engagement of the outer connecting lug 20 with the outer side of the guide eye 15 and upon completing this inward movement of the lid the same is lowered upon the pot whereby the inner connecting lug 21 is engaged with the outer side of the pot, as shown in Fig. 1, thereby interlocking the lid and pot against horizontal movement relatively to each other in the direction of the coupling rod and preventing the lid from being opened accidentally. While the lid is thus lowered the coupling rod is arranged within the clearance notches 17, 18 of the pot, as shown in Fig. 1, thereby preventing accidental displacement of the lid on the pot in a direction laterally of the rod and thus ensuring retaining the lid in a position in which the inscription thereon is in its proper place over the pot.

When it is desired to uncover the pot to permit of placing flowers therein, that portion of the lid adjacent to the inner connecting lug 21 is first lifted out of engagement from the adjacent outer side portion of the pot and then the lid is pushed outwardly until the inner connecting lug 21 engages with the inner side of the guide eye 15, as shown by dotted lines in Fig. 1, thereby fully uncovering the pot. While the lid is in this uncovered position the outer connecting lug 20 rests on the ground and thus maintains the lid at this time in a horizontal position and prevents the coupling rod from exerting a bending strain on the eye 15 and arm 13 and possibly bending or breaking the same.

For the purpose of preventing the lid from being depressed at its short edges and possibly bent or injured the lid is provided on its underside adjacent to these edges with downwardly projecting supporting feet or lugs 23 which are adapted to rest on the surface of the ground in the closed and open position of the lid and thus provide sufficient support for the lid to always maintain the same in its proper horizontal position.

The outer lug 20 is preferably arranged close to one of the long edges of the lid and the inner lug 21 is arranged at a distance from the other long edge of the lid so that when the latter is closed the same is centered relative to the pot, as shown in Figs. 1 and 3. The lid 12 and its lugs 20 and feet 23 are preferably formed integrally by casting the same of suitable material, such as non-corrosive metal.

I claim as my invention:

1. A grave marker and flower holder comprising a pot adapted to be sunk in the ground, and a lid slidable horizontally on the upper end of the pot for covering and uncovering the same and adapted to serve as an inscription plaque.

2. A grave marker and flower holder comprising a pot adapted to be sunk in the ground, and a lid movably connected with the upper end of said pot so as to be capable of both a horizontally sliding as well as a vertically tilting movement relative thereto for covering and uncovering said pot.

3. A grave marker and flower holder comprising a pot adapted to be sunk in the ground, a lid for covering and uncovering said pot, and means for movably connecting said pot and lid including an eye arranged on the pot, and a horizontal rod mounted on the lid and arranged in said eye.

4. A grave marker and flower holder comprising a pot adapted to be sunk in the ground, a lid for covering and uncovering said pot, and means for movably connecting said pot and lid including a horizontal rod arranged underneath the lid, lugs projecting downwardly from said lid and connected with opposite ends of said rod, and an eye arranged on the pot and receiving said rod between said lugs.

5. A grave marker and flower holder comprising a pot adapted to be sunk in the ground, a lid for covering and uncovering said pot, and means for movably connecting said pot and lid, including a horizontal rod arranged underneath the lid, lugs projecting downwardly from said lid and connected with opposite ends of said rod, an arm projecting laterally from the upper part of said pot and provided at its outer end with an upwardly projecting eye which receives said rod.

6. A grave marker and flower holder comprising a pot adapted to be sunk in the ground, a lid for covering and uncovering said pot, and means for movably connecting said pot and lid including a horizontal rod arranged underneath the lid, lugs projecting downwardly from said lid and connected with opposite ends of said rod, an arm projecting laterally from the upper part of said pot and provided at its outer end with an upwardly projecting eye which receives said rod, one of said lugs being adapted to engage with the outer side of said eye and the other lug being adapted to engage with the outer side of said pot opposite said arm.

7. A grave marker and flower holder comprising a pot adapted to be sunk in the ground, a lid for covering and uncovering said pot, and means for movably connecting said pot and lid including a horizontal rod arranged underneath the lid, lugs projecting downwardly from said lid and connected with opposite ends of said rod, an arm projecting laterally from the upper part of said pot and provided at its outer end with an upwardly projecting eye which receives said rod, one of said lugs being adapted to engage with the outer side of said eye and the other lug being adapted to engage with the outer side of said pot opposite said arm, and said pot being provided with an upwardly opening notch above the inner end of said arm and an upwardly opening notch on the diametrically opposite part of said pot, which notches are adapted to receive said rod in the closed position of said lid.

8. A grave marker and flower holder comprising a pot adapted to be sunk in the ground, a lid for covering and uncovering said pot, means for movably connecting the central part of said lid with the pot, and supporting feet arranged on the lid on opposite sides of said connecting means and adapted to rest on the ground.

HERBERT C. SCHOEPFLIN.